Figure 7:
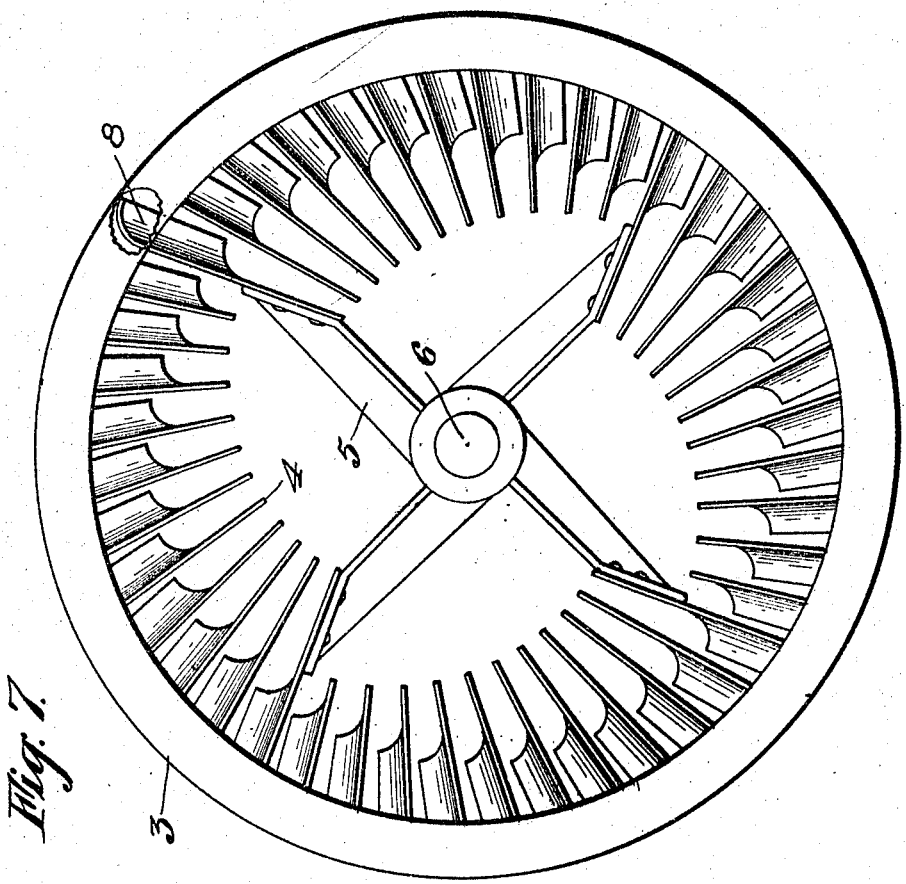

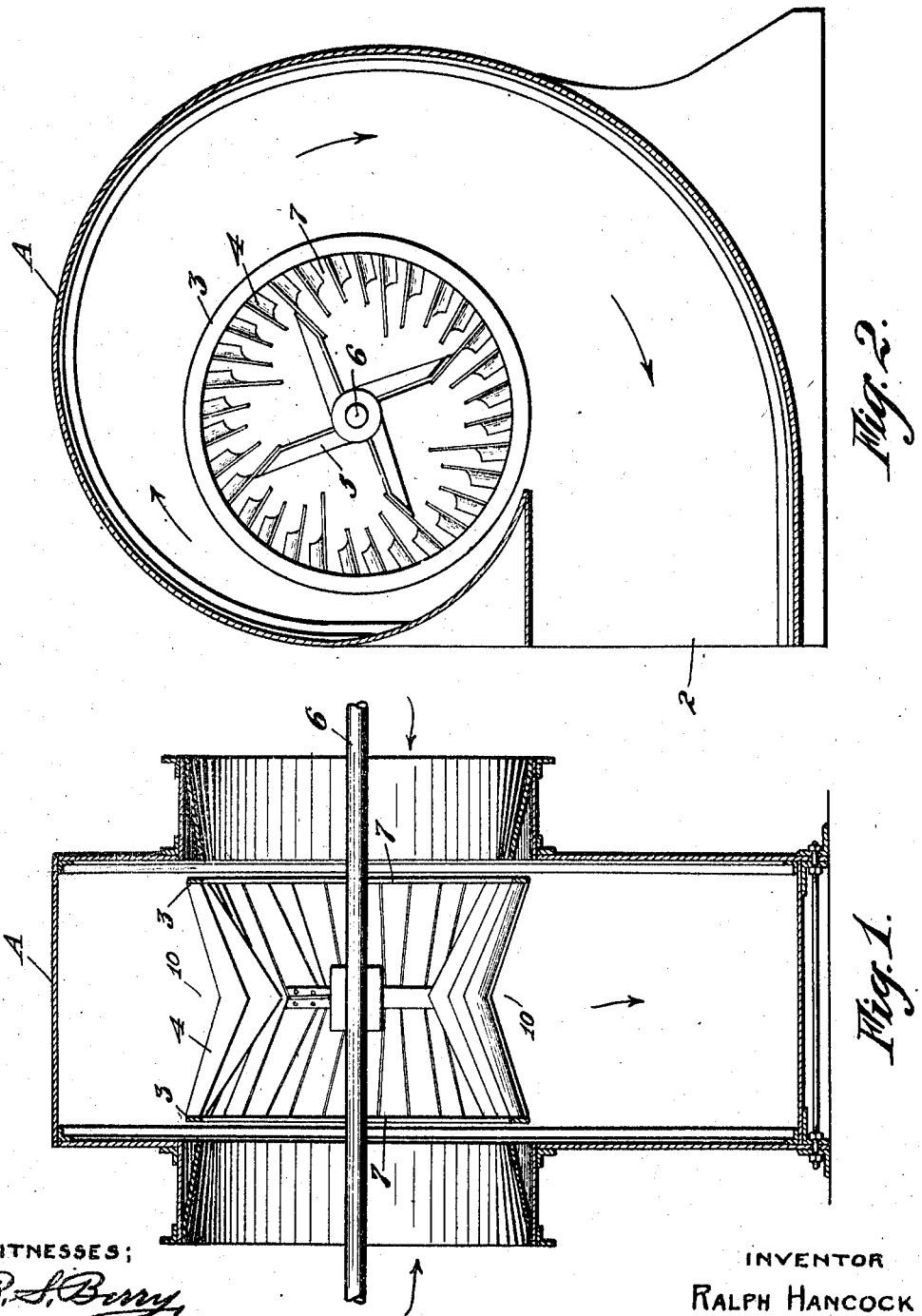

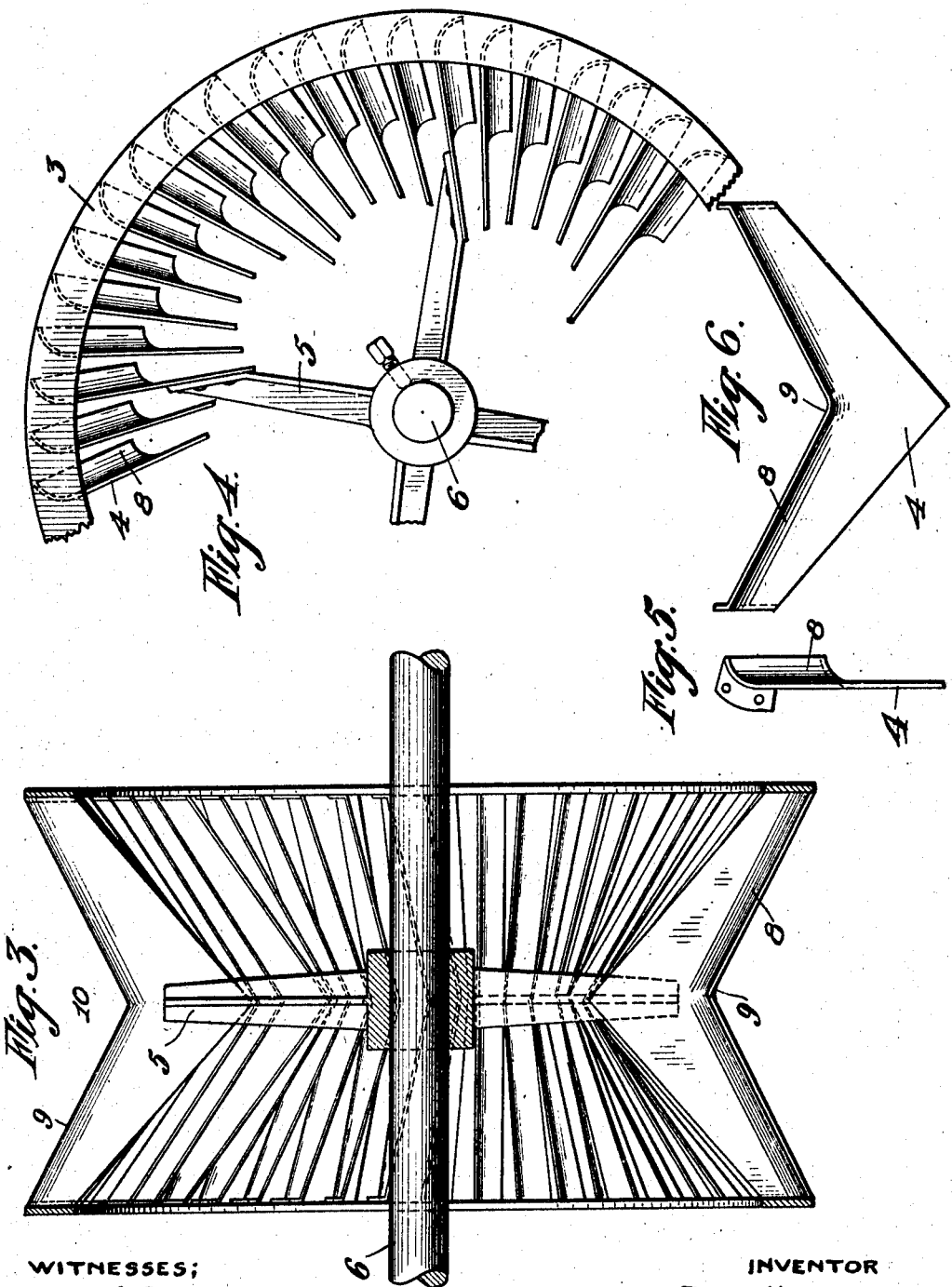

R. HANCOCK.
CENTRIFUGAL FAN.
APPLICATION FILED SEPT. 6, 1910.

1,031,180.

Patented July 2, 1912.
3 SHEETS—SHEET 3.

WITNESSES;

INVENTOR
RALPH HANCOCK

BY

HIS ATTORNEY

UNITED STATES PATENT OFFICE.

RALPH HANCOCK, OF SAN FRANCISCO, CALIFORNIA.

CENTRIFUGAL FAN.

1,031,180.  Specification of Letters Patent.  Patented July 2, 1912.

Application filed September 6, 1910. Serial No. 580,600.

*To all whom it may concern:*

Be it known that I, RALPH HANCOCK, citizen of Great Britain, residing in the city and county of San Francisco and State of California, have invented new and useful Improvements in Centrifugal Fans, of which the following is a specification.

My invention relates to centrifugal fans and blowers in which the fluid operated on is admitted axially and discharged circumferentially.

The object of the present invention is to provide a simple, practical fan having a maximum efficiency within a wide range of conditions of operation; to provide a maximum inlet with the largest blade area practical, and in which the blades are so shaped that in providing a maximum blade area the area of the inlet is not obstructed. Also to design the runner and the blades therefor so as to provide both maximum inlet area and maximum blade area, and at the same time prevent the natural rush of the air to the extreme ends of the blade, giving a greater distribution along the surface of the blades.

Another object is to so shape the blades that the runner will be more efficient in its work against a greater range and variation of pressure, whereby the device is adapted to a greater range of commercial requirements than the fans at present in use.

There are other objects and advantages which will appear hereinafter, having reference to the accompanying drawings, in which—

Figure 1 is a longitudinal section of the invention. Fig. 2 is a cross-section at right angles to Fig. 1. Fig. 3 is an enlarged section of the runner. Fig. 4 is a side elevation in section, of a part of the runner shown in Fig. 3. Fig. 5 is an edge view of the blade in Fig. 3. Fig. 6 is an elevational view of the same. Fig. 7 is a longitudinal section showing another arrangement of the blades in the runner.

A represents a suitable casing, here shown as involute in form, having an outlet as 2. The runner comprises two rings 3, suitably spaced apart and connected by the blades 4 and supported by the spokes 5 from the central shaft 6. The runner is preferably open at both ends to provide the double suction inlets 7, the outlet for the air or other fluid drawn in by the runner being through the interstices between the blades into the involute of the case A.

The invention resides especially in the shape of the blades 4. In all cases the blades are deepest or widest at their center and taper off gradually toward their ends adjacent to the intake 7, where they are narrowest. In Fig. 4 the blades are substantially V-shaped in form, widest in the central middle plane of the runner, and narrowest where they join the rings 3. Also each blade is given a transverse dish, as shown at 8, Figs. 5 and 6, and the blades do not stand exactly radial but rather incline with respect to a radial plane passing through their ends. In other words, the blades are fixed at an angle to the center so that instead of their being directed toward the center of the runner they will intercept the air entering the runner in a more efficient way.

Another feature to be observed is the successive arrangement of the blades in the runner as shown in Figs. 2 and 4, in which each succeeding blade is of different radial depth from its immediate neighbor. That is, the deepest blades are those of largest area, shown as connected with spokes 5; the blades shortening in radial depth to each side of these deepest blades so that a view of the apexes of the several blades presents a scalloped outline, as shown in Figs. 2 and 4. At the same time each blade as viewed end-wise is approximately in the same plane.

The outer edge 9 of each blade 4 is made reëntrant, the purpose of which is to permit of an increase in the area of the inlet openings 7, and at the same time provide a greater blade area without a reduction of the air space within the casing around the outer periphery of the runner. By extending the outer diameter of the outer edges of the runner farther into the casing and reducing the outer diameter of the center of the runner a triangular space 10 is obtained, equal in area to the rectangular space formed if a straight blade were used.

Fig. 7 represents a modification of an arrangement of blades in which the same shape of blade is used as before described, but the gradual lessening and depth of the blades follows in successive series, each series of blades circumferentially around the wheel or runner having the longest blade at one end and the shortest blade at the other end of the series, stepping up immediately from the shortest end of the succeeding series. In both of these cases I have a centrifugal fan or runner with blades so shaped that the intake for the entering air into the casing is made large, and the largest area of blade surface is brought into use without obstructing the area of the inlet; said area of the inlet it will be observed, being the inside diameter of the rings 3. Also that the blades are so shaped by being made deepest in the longitudinal center of the runner thereby offering the increased area so obtained to the passage of the air, preventing the natural rush to the extreme ends of the blade, and giving a greater distribution along the surface of the blade. Also by graduating the depths of successive blades as illustrated in Figs. 2-4 and 7, the runner is made more efficient in its work against a greater range of pressure, that is to say, in case of a lower pressure the shallower blades are given highest efficiency, while in the case of greater pressure the deeper blades are given their highest efficiency. This design means a greater range of commercial requirements than that obtained by fans at present in use, which have a uniform depth of blade; whereas in my device the runner has a graduated radial depth entirely around its circumference. This shape of blade gives great rigidity and strength.

When working as a double inlet fan with intakes on both sides the greater blade area obtained gives large output, and efficiency. Furthermore, this large blade area is obtained without causing any obstruction in the intake. A large number of blades can be arranged in a greater area of the runner without crowding.

The peculiar construction of these blades, is such that the outer ends lie in a circumference whose diameter is greater than that of the inlet opening, while the central portions are of a diameter less than the inlet opening. The areas of that portion of the fan blades exterior to the diameter of the inlet opening are substantially equal to the V-shaped central spaces between the diameter of the circumference of the inlet openings and the reëntrant angle of the blades.

It will be manifest that the largest area of blade surface is brought into use without obstructing the inlet area; while the deeper space provided by the central depression of the blades, offers the largest possible area of air passage.

Having thus described my invention, what I claim and desire to secure by Letters Patent, is—

1. The combination in a centrifugal fan, of a casing, having an end inlet and a peripheral outlet, a runner coaxial with the inlet, said runner consisting of blades whose outer and inner edges are V-formed, so that the edge of the blade nearer the axis of the runner forms a salient angle and the opposite edge a reëntrant angle, the outer diameter of said runner at the ends being greater than the diameter of the inlet in the casing, and the sum of the areas of the portions of the blades extending beyond the diameter of the inlet opening equaling the sum of the triangular reëntrant spaces indicated between the blades and said inlet opening diameter.

2. In a centrifugal fan, a casing having an end inlet opening and peripheral discharge, a runner within the casing journaled coaxially with said inlet opening, said runner having V-shaped blades, said blades wider at their central apexed portions in the radial direction of the blades and narrowest at their ends, the ends of the blades extending beyond the circumference of the inlet opening, and the sum of the areas of the portions of the blades extending beyond the diameter of the inlet opening equaling the sum of the areas of the spaces included between the reëntrant angles of the blades and said inlet opening diameter.

3. In a centrifugal fan, a casing having an end inlet opening and a peripheral discharge, a runner within the casing journaled coaxially with said inlet opening, said runner having V-shaped blades, said blades wider at their central apexed portions in the radial direction of the blades and narrowest at their ends, the ends of the blades extending beyond the circumference of the inlet opening, and the sum of the areas of the portions of the blades extending beyond the diameter of the inlet opening equaling the sum of the areas of the spaces included between the reëntrant angles of the blades and said inlet opening diameter, said blades varying in radial depth.

4. A centrifugal fan comprising a casing with an end inlet opening and a peripheral discharge, a runner in the casing and coaxial with the inlet, composed of end rings and V-shaped blades, each of which blades is narrowest in the radial direction at its ends, the edge of the blade between its ends nearer the axis of the runner forming a salient angle, the opposite edge forming a reëntrant angle, said salient angle being less than the reëntrant angle, with the apexes of both angles approximately equidistant from the ends of the blade, said apexed portion being the widest part of the blade, and the blade gradually tapering and diminishing in width toward its ends, and spokes connecting the blades with the runner shaft.

5. A centrifugal fan comprising a casing with an end inlet opening and a peripheral discharge, a runner in the casing and coaxial with the inlet, composed of end rings and V-shaped blades, each of which blades is narrowest in the radial direction at its ends, the edge of the blade between its ends nearer the axis of the runner forming a salient angle, the opposite edge forming a reëntrant angle, said salient angle being less than the reëntrant angle, with the apexes of both angles approximately equidistant from the ends of the blade, said apexed portion being the widest part of the blade, and the blade gradually tapering and diminishing in width toward its ends, and spokes connecting the blades with the runner shaft, said blades extending at an angle with the radial planes of the runner.

6. A centrifugal fan comprising a casing with an end inlet opening and a peripheral discharge, a runner in the casing and coaxial with the inlet, composed of end rings and V-shaped blades, each of which blades is narrowest in the radial direction at its ends, the edge of the blade between its ends nearer the axis of the runner forming a salient angle, the opposite edge forming a reëntrant angle, said salient angle being less than the reëntrant angle, with the apexes of both angles approximately equidistant from the ends of the blade, said apexed portion being the widest part of the blade, and the blade gradually tapering and diminishing in width toward its ends, and spokes connecting the blades with the runner shaft, said blades disposed in series, the blades of each series of successively increasing depth.

7. In a centrifugal fan, a casing having an end inlet opening, a runner journaled within the casing and coaxially with said opening, and having blades with reëntrant outer edges, said blades each having that edge which is nearest the axis of the runner forming a salient angle, the opposite edge forming a reëntrant angle, said blades widest in their central apexed portions, and gradually tapering and diminishing in width toward their ends, and the ends of said blades extending beyond the circumference of the inlet opening, and the major portions of said blades between their ends lying inside of a cylindrical surface which is concentric with the runner axis and concentric with the inlet opening, and of the same diameter as the inlet opening.

8. In a centrifugal fan, a casing having an end inlet opening, a runner journaled within the casing and coaxially with said opening, and having blades with reëntrant outer edges, said blades each having that edge which is nearest the axis of the runner forming a salient angle, the opposite edge forming a reëntrant angle, said blades widest in their central apexed portions, and gradually tapering and diminishing in width toward their ends, and the ends of said blades extending beyond the circumference of the inlet opening, and the major portions of said blades between their ends lying inside of a cylindrical surface which is concentric with the runner axis and concentric with the inlet opening and of the same diameter as the inlet opening, said blades disposed in series, the blades in each series varying in radial depth.

9. In a fan runner, a blade narrowest in the radial direction at its ends, the edge of the blade between its ends nearer the axis of the runner forming a salient angle, the opposite edge forming a reëntrant angle, said salient angle being less than the reëntrant angle, with the apexes of both angles approximately equidistant from the ends of the blade, said apexed portion being the widest part of the blade, and the blade gradually tapering and diminishing in width toward its ends.

10. In a centrifugal fan, a casing with end inlet openings, a runner journaled within the casing and having blades which are narrowest in the radial direction at their ends, each blade between its ends having its edge nearer the axis of the runner in the form of a salient angle and the opposite edge of the blade in the form of a reëntrant angle, said salient angle being less than the reëntrant angle, the apexes of all the angles in alinement and in the plane substantially equidistant from the ends of the runner, the blades being widest at their apexed portion and tapering and diminishing gradually in width toward their ends, said inlets in the casing being in unobstructed connection through the runner.

11. In a fan runner, a blade having a flat portion, the edge of the blade of the runner nearer the axis of the runner forming a salient angle in outline, and the opposite edge a reëntrant angle in outline so as to form a substantially V-shaped flat blade surface, said salient angle being less than the reëntrant angle and the apexes of both in alinement so that the flat blade surface will be of greater width midway of its length than at its terminals, the reëntrant angular edge of the flat portion being curved and said flat portion being a continuation of said curved portion and tangential thereto.

12. In a fan runner, a blade having a flat portion, the edge of the runner nearer the axis of the runner forming a salient angle in outline and the opposite edge of which is a reëntrant angle in outline so as to form a substantially V-shaped flat blade surface, said salient angle being less than the reëntrant angle and the apexes of both in alinement, so that the flat blade surface will be of greater width midway of its length than at its terminals, the reëntrant angular edge of the flat portion being curved, said flat portion being a continuation of said curved portion and tangential thereto, said curved portion extending the length of the blade at approximately an equal radius throughout its length, the curved portion terminating at its edges on a line parallel with the flat portion of the blades.

13. In a centrifugal fan, a fan runner comprising a series of blades, each blade having a flat portion, the edge of the runner nearer the axis of the runner forming a salient angle in outline and the opposite edge of which is a reëntrant angle in outline, said salient angle being less than the reëntrant angle, the apexes of the angles alined, a curved portion on the outer edge of the flat portion and in continuation thereof, said curved portion extending throughout the length of the blade, rings by which the ends of the blades are supported, a shaft disposed axially to the rings, a hub on the shaft, and spokes connecting the blades to the hub.

14. In a centrifugal fan, a fan runner comprising a series of blades, each blade having a flat portion, the edge of the runner nearer the axis of the runner forming a salient angle in outline and the opposite edge forming a reëntrant angle in outline, said salient angle being less than the reëntrant angle, the apexes of the angles alined, a curved portion on the outer edge of the flat portion and in continuation thereof, said curved portion extending through the length of the blade, rings by which the ends of the blades are supported, a shaft disposed axially to the rings, a hub on the shaft, spokes connecting the blades to the hub, said blades equally spaced and arranged within the rings with their flat portion extending parallel with the axis of the shaft, and each blade inclined to the intersecting radii.

15. In a centrifugal fan, a fan runner comprising a series of blades, each blade having a flat portion, the edge of the runner nearer the axis of the runner forming a salient angle in outline and the opposite edge forming a reëntrant angle in outline, said salient angle being less than the reëntrant angle, the apexes of the angles alined, a curved portion on the outer edge of the flat portion and a continuation thereof, said curved portion extending through the length of the blade, rings by which the ends of the blades are supported, a shaft disposed axially to the rings, a hub on the shaft, and spokes connecting the blades to the hub, said blades equally spaced and arranged within the rings with their flat portion extending parallel with the axis of the shaft, each blade inclined to the radii which intersect the blade, the flat portion of adjacent blades being of different radial depth to give graduated surfaces of blade areas.

16. In a centrifugal fan, a casing with end inlet openings, a runner journaled within the casing and having blades which are narrowest in the radial direction at their ends, each blade between its ends having its edge nearest the axis of the runner in the form of a salient angle and the opposite edge of the blade in the form of a reëntrant angle, said salient angle being less than the reëntrant angle, the apexes of all the angles in alinement and in the plane substantially equidistant from the ends of the runner, the blades being widest at their apexed portion and tapering and diminishing gradually in width toward their ends, said inlets in the casing being in unobstructed connection through the runner, said blades arranged in circumferential series with successive blades in each series varying in radial depth.

17. A blade for centrifugal fans, consisting of a plate having its outside and inside edges both in the form of an opened-out V, with the central apexed portion of the plate widest in the radial direction, the plate tapering and diminishing in width toward the ends, said plate having its edge which is reëntrant and which is farthest from the axis of the fan curved while the body of the plate is generally flat, said curved portion being a continuation of and substantially tangential to the flat portion.

In testimony whereof I have hereunto set my hand in the presence of two subscribing witnesses.

RALPH HANCOCK.

Witnesses:
CHARLES H. PENFIELD,
F. E. MAYNARD.

---

Copies of this patent may be obtained for five cents each, by addressing the " Commissioner of Patents, Washington, D. C."